Figure 1:
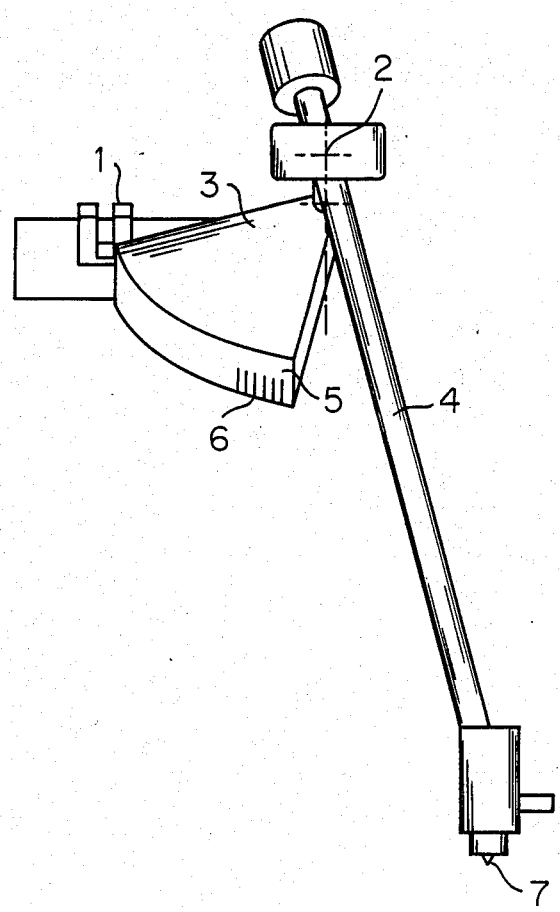

United States Patent [19]
Held

[11] Patent Number: 4,827,467
[45] Date of Patent: May 2, 1989

[54] RECORD-PLAYER SWITCH-OFF DEVICE

[75] Inventor: Helmut Held, Langenschiltach, Fed. Rep. of Germany

[73] Assignee: Deutsche Thomson-Brandt GmbH, Villingen, Fed. Rep. of Germany

[21] Appl. No.: 27,201
[22] PCT Filed: Jun. 28, 1986
[86] PCT No.: PCT/EP86/00382
  § 371 Date: Mar. 2, 1987
  § 102(e) Date: Mar. 2, 1987
[87] PCT Pub. No.: WO87/00672
  PCT Pub. Date: Jan. 29, 1987

[30] Foreign Application Priority Data
  Jul. 24, 1985 [DE] Fed. Rep. of Germany ....... 3526422

[51] Int. Cl.⁴ .......................... G11B 3/06; G11B 17/06
[52] U.S. Cl. ..................................... 369/243; 369/226
[58] Field of Search ........................ 369/226, 234-237, 369/243; 250/237 G

[56] References Cited

U.S. PATENT DOCUMENTS

| 4,320,496 | 3/1982 | Kikuchi | 369/226 |
| 4,437,181 | 3/1984 | Kishima | 369/226 X |
| 4,453,245 | 6/1984 | Sugiyama et al. | 369/243 X |
| 4,712,100 | 12/1987 | Tsunekuni et al. | 250/237 G X |

FOREIGN PATENT DOCUMENTS 1243412 4/1985 Fed. Rep. of Germany .

Primary Examiner—Stuart S. Levy
Assistant Examiner—Steven M. duBois
Attorney, Agent, or Firm—Max Fogiel

[57] ABSTRACT

Stopping system for the drive mechanism of a records-player, comprising a pivotable aperture linked with the playback arm, fixed to a sector, and possessing a light-/dark zone towards the end of its pivoting range. This zone is scanned by a photoelectric barrier in the sharp range and issues the stop command by means of an evaluation logic.

6 Claims, 3 Drawing Sheets

RECORD-PLAYER SWITCH-OFF DEVICE

The invention concerns a switch-off device as recited in the preamble to the major claim.

A switch-off device extensively similar to the one recited in that preamble is known from German Patent No. 1 243 412. It is provided with a screen that is connected to the pickup arm and passes through a light barrier as the arm swings. Providing the screen with a series of holes in such a way that a higher number of pulses will be detected due to the higher swinging speed per unit of time in the lead-out groove is already state of the art. This solution, however, does not work very satisfactorily, and both manufacturing costs and demands on precision are high. A number of different timing components for the various speeds of the drive mechanism are accordingly connected in and can be traveled through in accordance with the aforesaid patent. Thus, when the pickup arm is swinging at a prescribed speed, the drive mechanism is switched off by means of a transistorized switching relay employing the voltage that occurs at its RC components. The level of voltage depends on how rapidly the current of light in the light barrier changes.

The data in relation to the lead-out groove pitch that have been standardized for records of different speeds (78, 33 ⅓, and 45 rpm), the various values in relation to the positions of what is called the sharp range, of the last marker groove and last modulated groove, and of the final grooves with the particular permissible tolerances, and finally the demand for an extremely inexpensive way of embodying the sidetrack function, all lead to the object of employing an actual electronic solution for that purpose.

This object is attained in accordance with the invention in a device like that recited in the preamble to the major claim by means of the characteristics recited in the body of that claim.

Further details and embodiments will be evident from the subsidiary claims and from the description of one embodiment.

The sharp range is defined in accordance with the standard between the last marker groove and the last modulated groove, in which the drive mechanism is switched off and optionally the pickup arm lifted and returned.

The bar code on the screen, a pattern of parallel and very narrow light and dark fields of equal width supplies, due to scanning with the light barrier, a sine-like voltage at the output terminal of the detector even in the sharp range. Higher-frequency effects deriving from utility modulation and eccentricity are imposed on the voltage. To obtain information that is independent thereof, a square-wave former that operates by switching hysteresis is positioned in the first stage of the connected processing circuit. The output terminal of the wave former is connected to mutually parallel branches of a high- and low-level processor. The high and low thresholds of these levels are initially detected in these parallel branches to determine the limits of the existing time window. The individual acceptable high or low pulses, stored in a memory, are then compared. The information derived from the comparators, a high and a low pulse, is added in subsequent stages and compared with stored reference times in another subsequent stage. The output signal from this stage supplies the desired unambiguous and undisturbed criterion for the switching process, which is initiated in the next stage.

The use of a light barrier with very high resolution in relation to the very narrow light and dark fields of 200 $\mu$m results in a practical way in a very satisfactory switching sensitivity of high reliability at low expense in that a microprocessor that is already present anyway is employed.

Figure 2:
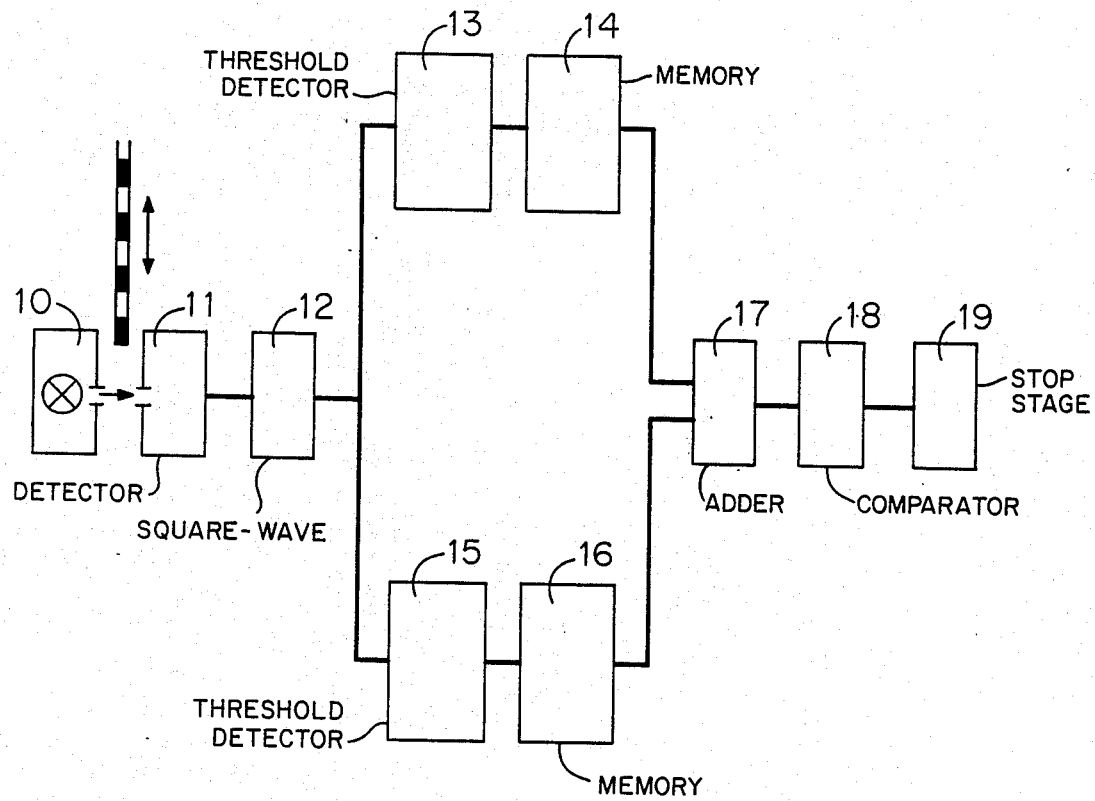
Figure 3:
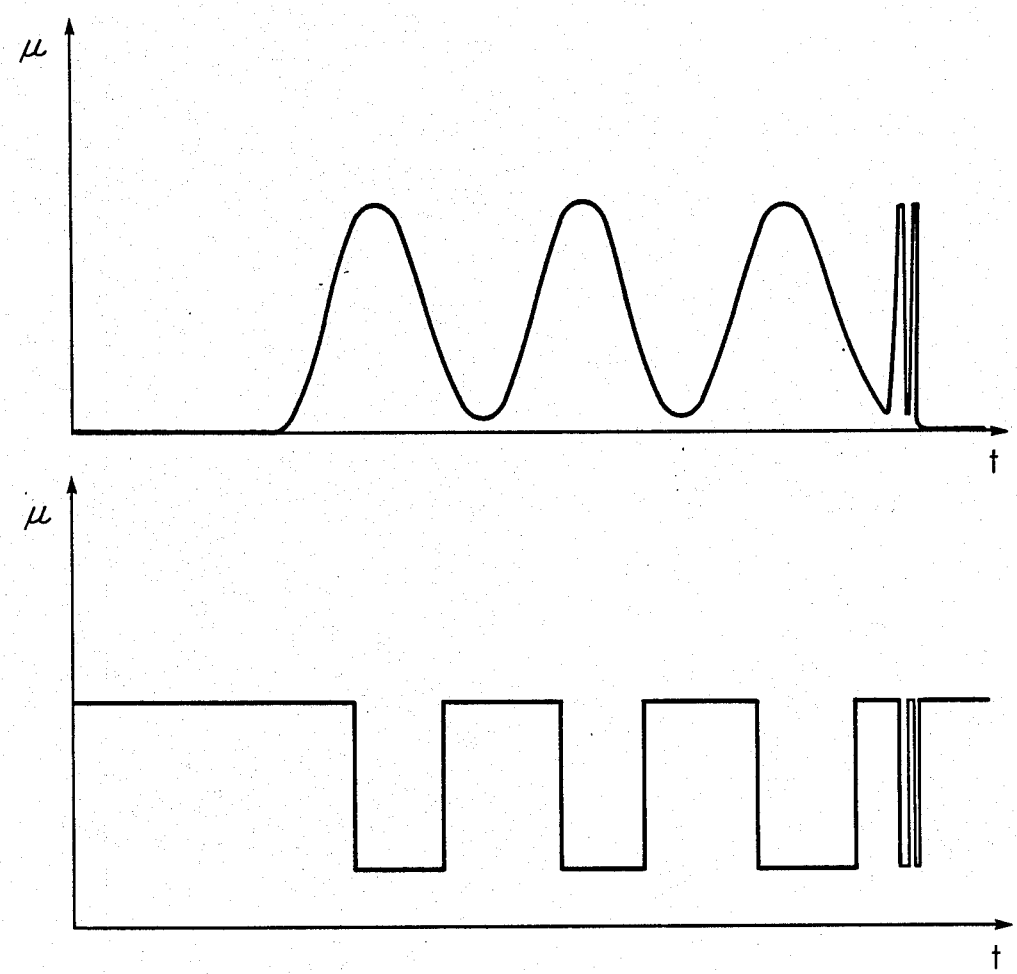

One embodiment of the invention will now be specified with reference to the drawings, wherein FIG. 1 is a simplified perspective view of the pickup arm, swing sector, screen, and light barrier, FIG. 2 is a block diagram of a processing circuit, and FIG. 3 shows two graphs illustrating the function of the processing circuit from FIG. 2.

FIG. 1 shows a light barrier 1 that a screen 5 enters when a pickup arm 4 swings. Screen 5 is secured to a sector 3 and swings along with arm 4 around a vertical axis 2. As a pickup 7 approaches the sharp range toward the end of playing one side of the disk, a light-and-dark pattern 6 on screen 5 enters light-barrier 1.

FIG. 2 illustrates the screen and the light barrier with its light source 10 and detector 11. A square-wave former 12 is connected with hysteresis to the output of detector 11 and supplies a square voltage to two mutually parallel series circuits, one with a high-level threshold detector 13 and comparator 14 and with a memory for acceptable high levels and the other with similar stages 15 and 16 for low-level processing. The outputs from both branches arrive at a high- and low-pulse adder stage 17. Comparison with stored maximum and minimum reference values is carried out in a subsequent comparison stage 18, and the stop procedure initiated in the subsequent final stage 19 depending on the output signal.

The upper graph in FIG. 3 will illustrate the operation by means of a sine-like curve. The output voltage from detector 11 would look just as ideal, without superimposition that is, in the absence of such modulations as utility tone and eccentricity. The sine-like curve that occurs at normal groove separation is followed by brief amplitudes while the end or lead-out groove is being traveled, whereby several alterations in screen light and dark per unit of time occur as will be evident. Only the standardized pitch relations will satisfy the circuit switch-off criterion in this case.

In the case of what is called a minimal lead-out groove, light barrier 1 (FIG. 1) will travel through 1.5 units of complete information, of which the subsequent logic circuit will process 1.0 units of complete information in order to switch off. One unit of complete information equals one light-and-dark field or one slot and one strip.

The bottom graph in FIG. 3 illustrates the voltage at the output terminal of stage 12. A specific switching hysteresis will be evident, as desirable to render interference frequencies ineffective as superimpositions.

What is claimed is:

1. A switch-off device for a mechanism driving a phonograph-record player, comprising: a pickup arm; a screen fastened to said pickup arm; a light barrier, said pickup arm traveling through said light barrier as said pickup arm swings without reaction; said light barrier having a pattern of light and dark; a sector swinging along with said pickup arm about an axis of said pickup arm; said screen comprising a pattern of bars applied to said sector; said sector having a uniform series of parallel light-permeable slots perpendicular to the direction of swing commencing in vicinity of an end corresponding to the end of disk-groove recording; a processing circuit comprising: a detector converting incoming light signals into a sequence of electric pulses; a square-wave shaper with switching hysteresis between high and low pulses connected to said detector; a first circuit branch for high level processing and having a high-level threshold detector connected in series with first memory means for determining acceptable high level pulses; a second circuit branch for low level processing and having a low-level threshold detector connected in series with second memory means for determining acceptable low level pulses; said first branch and said second branch being connected in parallel with inputs connected to an output of said square-wave shaper; adding means connected to outputs of said first memory means and said second memory means for adding high level and low level pulses; comparator means connected to an output of said adding means and having a stored time reference; an output stage for carrying out a switch-off order, said comparator means comparing digital time values, said switching hysteresis rendering interference frequencies ineffective as superimpositions.

2. A switch-off device as defined in claim 1, wherein the spacing and width of said slots is on the order of 200 micrometers.

3. A switch-off device as defined in claim 1, wherein a region of slots is positioned on said screen so that said region begins at the commencement of a sidetracker sharp range, said sidetracker sharp range being a standardized range between a last marker groove and a last modulated groove and being positioned before commencement of a switching groove.

4. A switch-off device as defined in claim 2, wherein said screen comprises a section of transparent sheet having a length corresponding to a light-and-dark bar zone at the end of a path in form of an arc of a circle applied to the periphery of a normal to the sector radius.

5. A switch-off device as defined in claim 1, wherein said light barrier travels through substantially 1.5 units of complete information, where one unit of complete information is substantially equal to one light-and-dark field, said processing circuit processing substantially 1.0 units of complete information for switch-off.

6. A switch-off device for a mechanism driving a phonograph-record player, comprising: a pickup arm; a screen fastened to said pickup arm; a light barrier, said pickup arm traveling through said light barrier as said pickup arm swings without reaction; said light barrier having a pattern of light and dark; a sector swinging along with said pickup arm about an axis of said pickup arm; said screen comprising a pattern of bars applied to said sector; said sector having a uniform series of parallel light-permeable slots perpendicular to the direction of swing commencing in vicinity of an end corresponding to the end of disk-groove recording; a processing circuit comprising: a detector converting incoming light signals into a sequence of electric pulses; a square-wave shaper with switching hysteresis between high and low pulses connected to said detector; a first circuit branch for high level processing and having a high-level threshold detector connected in series with first memory means for determining acceptable high level pulses; a second circuit branch for low level processing and having a low-level threshold detector connected in series with second memory means for determining acceptable low level pulses; said first branch and said second branch being connected in parallel with inputs connected to an output of said square-wave shaper; adding means connected to outputs of said first memory means and said second memory means for adding high level and low level pulses; comparator means connected to an output of said adding means and having a stored time reference; an output stage for carrying out a switch-off order, said comparator means comparing digital time values, said switching hysteresis rendering interference frequencies ineffective as superimpositions; said slots having a spacing and a width on the order of 200 micrometers; a region of slots being positioned on said screen so that said region begins at the commencement of a sidetracker sharp range, said sidetracker sharp range being a standardized range between a last marker groove and a last modulated groove and being positioned before commencement of a switching groove; said screen comprising a section of transparent sheet having a length corresponding to a light-and-dark bar zone at the end of a path in form of an arc of a circle applied to the periphery of a normal to the sector radius; said light barrier travelling through 1.5 units of complete information, where one unit of complete information is substantially equal to one light-and-dark field, said processing circuit processing 1.0 units of complete information for switch off.

* * * * *